(12) United States Patent
Ishihara

(10) Patent No.: US 12,085,401 B2
(45) Date of Patent: Sep. 10, 2024

(54) INFORMATION PROCESSING DEVICE, INFORMATION PROCESSING METHOD, AND IN-VEHICLE UNIT

(71) Applicant: TOYOTA JIDOSHA KABUSHIKI KAISHA, Toyota (JP)

(72) Inventor: Manabu Ishihara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 17/674,420

(22) Filed: Feb. 17, 2022

(65) Prior Publication Data

US 2022/0276064 A1 Sep. 1, 2022

(30) Foreign Application Priority Data

Mar. 1, 2021 (JP) ................................ 2021-031723

(51) Int. Cl.
 *G01C 21/34* (2006.01)
 *B60W 40/08* (2012.01)
 *G01C 21/36* (2006.01)

(52) U.S. Cl.
 CPC ......... *G01C 21/3484* (2013.01); *B60W 40/08* (2013.01); *G01C 21/3461* (2013.01); *G01C 21/3605* (2013.01)

(58) Field of Classification Search
 CPC ............. B60W 40/08; G01C 21/3484; G01C 21/3461; G01C 21/3605
 See application file for complete search history.

(56) References Cited

U.S. PATENT DOCUMENTS

| | | | |
|---|---|---|---|
| 2007/0287415 A1 | 12/2007 | Yamada | |
| 2008/0214165 A1 | 9/2008 | Matsumura et al. | |
| 2009/0197593 A1* | 8/2009 | Farrell | G08G 1/205 455/426.1 |
| 2013/0006769 A1* | 1/2013 | Schalk | G06Q 30/0266 705/14.62 |
| 2016/0344747 A1* | 11/2016 | Link, II | H04W 4/021 |
| 2020/0027283 A1 | 1/2020 | Nishikawa | |
| 2020/0202453 A1* | 6/2020 | Sworski | G07C 5/008 |
| 2020/0357075 A1* | 11/2020 | Dahl | G07C 5/0816 |

FOREIGN PATENT DOCUMENTS

| | | |
|---|---|---|
| CN | 107615291 A | 1/2018 |
| JP | 2007-280021 A | 10/2007 |
| JP | 2020-011663 A | 1/2020 |
| WO | 2006/134799 A1 | 12/2006 |
| WO | 2016191075 A1 | 12/2016 |

* cited by examiner

*Primary Examiner* — Seth A Silverman
(74) *Attorney, Agent, or Firm* — Oliff PLC

(57) ABSTRACT

In an information processing device according to the present disclosure, a control unit acquires information on a contract user of a telematics service usable through an in-vehicle unit. The control unit transmits, to the in-vehicle unit, a command for presenting the information on the contract user to an occupant of a vehicle at a timing at which an operation relating to use of the telematics service is performed on the in-vehicle unit or a timing at which the vehicle is started.

5 Claims, 9 Drawing Sheets

FIG. 4

| UNIT ID | CONTRACT USER INFORMATION | |
|---|---|---|
| D001 | — — — | } CONTRACT INFORMATION TABLE |
| D002 | — — — | } CONTRACT INFORMATION TABLE |
| D003 | — — — | } CONTRACT INFORMATION TABLE |
| ⋮ | ⋮ | |

FIG. 8

| UNIT ID | CONTRACT USER INFORMATION | STORAGE LOCATION | |
|---|---|---|---|
| D001 | — — — | — — — | } CONTRACT INFORMATION TABLE |
| D002 | — — — | — — — | } CONTRACT INFORMATION TABLE |
| D003 | — — — | — — — | } CONTRACT INFORMATION TABLE |
| ⋮ | ⋮ | ⋮ | |

INFORMATION PROCESSING DEVICE, INFORMATION PROCESSING METHOD, AND IN-VEHICLE UNIT

CROSS-REFERENCE TO RELATED APPLICATION

This application claims priority to Japanese Patent Application No. 2021-031723 filed on Mar. 1, 2021, incorporated herein by reference in its entirety.

BACKGROUND

1. Technical Field

The present disclosure relates to an information processing device, an information processing method, and an in-vehicle unit.

2. Description of Related Art

In recent years, a technique for providing a telematics service to a telematics communication unit mounted on a vehicle has become widespread (see, for example, Japanese Unexamined Patent Application Publication No. 2020-011663 (JP 2020-011663 A).

SUMMARY

An object of the present disclosure is to provide a technique capable of suppressing convenience of a user who uses a telematics service from being impaired.

The present disclosure can be regarded as an information processing method. The information processing method in that case may include, for example, a control unit that executes: acquisition of information on a contract user who has a contract for a telematics service usable through an in-vehicle unit mounted on a vehicle; and transmission of a command for presenting the information on the contract user to an occupant of the vehicle at a predetermined timing to the in-vehicle unit.

The present disclosure can also be regarded as an information processing method executed by a computer. For example, the information processing method executed by the computer in that case may include: a step of acquiring information on a contract user who has a contract for a telematics service usable through an in-vehicle unit mounted on a vehicle; and a step of transmitting a command for presenting the information on the contract user to an occupant of the vehicle at a predetermined timing to the in-vehicle unit.

The present disclosure can also be regarded as an in-vehicle unit mounted on a vehicle. The in-vehicle unit in that case may include, for example, a control unit that executes: acquisition of information on a contract user who has a contract for a telematics service usable through the in-vehicle unit from a predetermined server device; and presentation of the information on the contract user to an occupant of the vehicle at a predetermined timing.

According to the present disclosure, it is possible to provide a technique capable of suppressing convenience of a user who uses a telematics service from being impaired.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram showing a configuration example of a contract information table stored in a contract management database;

FIG. 8 is a diagram showing a configuration example of a contract information table stored in a contract management database according to the modification.

DETAILED DESCRIPTION OF EMBODIMENTS

Figure 1:
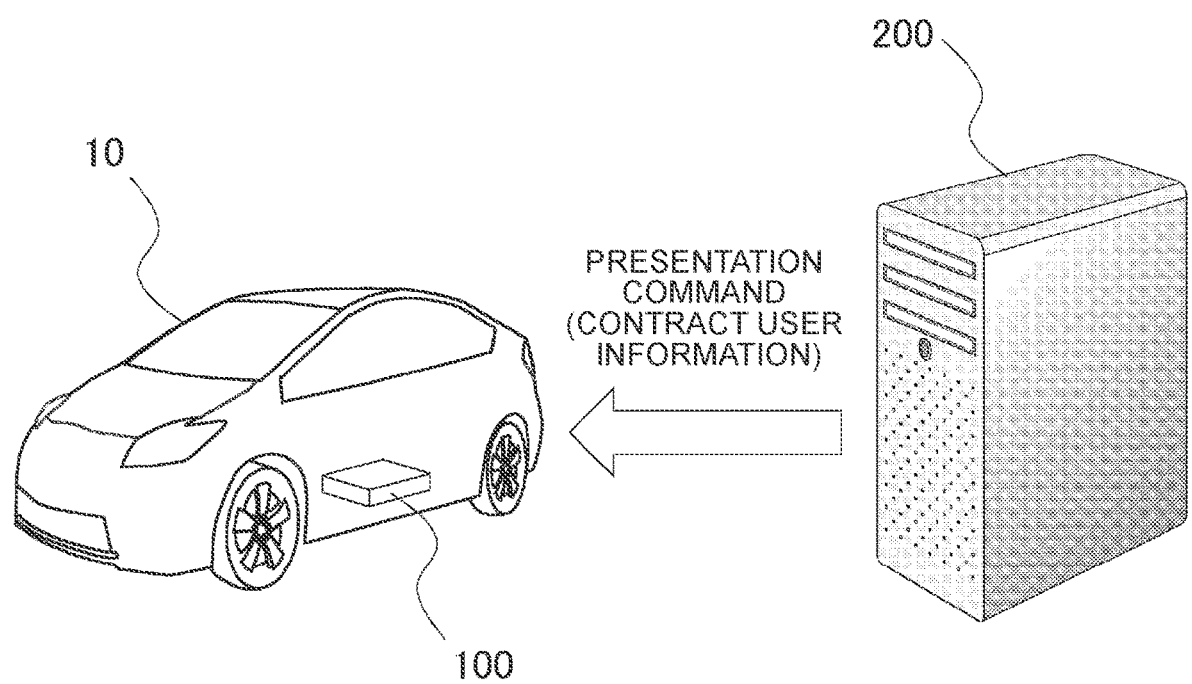
FIG. 1 is a diagram showing a schematic configuration of a telematics system.

An information processing device according to the present disclosure is applied to a system for providing a telematics service (hereinafter may be referred to as a "telematics system"). The telematics service includes services such as information search, update of map data of car navigation systems, setting destinations of car navigation systems, emergency calls, provision of vehicle maintenance information, voice calls with operators, or remote operations of vehicles. The telematics system provides the telematics service to a vehicle occupant through an in-vehicle unit mounted in the vehicle by causing the in-vehicle unit and the information processing device installed outside of the vehicle to perform two-way communication therebetween. In such a telematics system, the in-vehicle unit is associated with a user (contract user) who has a contract for the telematics service. Therefore, when a right to use the vehicle is transferred from a first user to a second user (for example, when the vehicle is sold by the first user to the second user) and the first user forgets to cancel the telematics service contract, a convenience of the first user and the second user may be impaired. For example, the contract fee may be unnecessarily charged to the first user, or the second user may not be able to use the desired telematics service. Further, the vehicle may be remotely operated against the will of the second user.

On the other hand, the information processing device according to the present disclosure acquires information (hereinafter may be referred to as "contract user information") on a contract user of the telematics service provided through the in-vehicle unit. The information processing device transmits a command for presenting the acquired contract user information to the occupant of the vehicle at a predetermined timing to the in-vehicle unit. With this configuration, in the in-vehicle unit that has received the above command, the contract user information of the contract user associated with the in-vehicle unit is presented to the occupant of the vehicle at the predetermined timing. The occupant who receives the contract user information can confirm whether the user who has the right to use the vehicle and the contract user match each other. For example, when the right to use the vehicle is transferred from the first user to the second user and the first user forgets to cancel the contract of the telematics service, the second user can be made aware that the first user forgets cancellation. As a result, the second user can take measures to cancel the contract of the telematics service by the first user. Therefore, it is possible to suppress the convenience of the first user and the second user from being impaired.

Note that, the contract user information may be a part of an e-mail address of the contract user. With this configuration, when the user who has the right to use the vehicle is different from the contract user, the user who has the right to use the vehicle can be suppressed from acquiring the personal information of the contract user. The information on the contract user is not limited to the above, and may be, for example, a part of a telephone number of the contract user, a nickname of the contract user, or the like.

The predetermined timing in the present disclosure may be the timing at which the operation relating to the use of the telematics service is performed on the in-vehicle unit. Here, the operation relating to the use of the telematics service is, for example, an operation for displaying a menu screen relating to the telematics service in the in-vehicle unit, and is an operation performed by the vehicle occupant. With this configuration, the occupant can be made aware of the information on the contract user each time the operation relating to the use of the telematics service is performed on the in-vehicle unit.

The predetermined timing according to the present disclosure may be the timing at which the vehicle is started. Here, the timing at which the vehicle is started is, for example, the timing at which the accessory power supply is switched from off to on, the timing at which the ignition switch (or power switch) is switched from off to on, and the like. With this configuration, the occupant can be made aware of the information on the contract user each time the vehicle is started. The predetermined timing may include both the timing at which the operation relating to the use of the telematics service is performed on the in-vehicle unit and the timing at which the vehicle is started. That is, the in-vehicle unit may present information on the contract user to the occupant each time an operation relating to the use of the telematics service is performed on the in-vehicle unit and each time the vehicle is started.

The predetermined timing according to the present disclosure may be the timing at which the operation relating to the use of the telematics service is first performed on the in-vehicle unit after the right to use the vehicle is estimated to have been transferred. With this configuration, only when the right to use the vehicle is estimated to have been transferred, information on the contract user is presented to the occupant at the timing when the operation relating to the use of the telematics service is first performed on the in-vehicle unit. As a result, it is possible to suppress the occupant from feeling annoyed.

The predetermined timing according to the present disclosure may be the timing at which the vehicle is first started after the right to use the vehicle is estimated to have been transferred. With this configuration, the information on the contract user is presented to the occupant at the timing when the vehicle is first started only when the right to use the vehicle is estimated to have been transferred. As a result, it is possible to suppress the occupant from feeling annoyed.

Here, when whether the right to use the vehicle has been transferred is estimated, a control unit may perform the estimation by the following three procedures.

(Procedure 1) The control unit periodically estimates the storage location of the vehicle based on the position information of the vehicle acquired through the in-vehicle unit.

(Procedure 2) The control unit determines whether the estimated storage location of the vehicle is changed from the previously estimated storage location.

(Procedure 3) When the control unit determines that the estimated storage location of the vehicle is changed from the previously estimated storage location, the control unit estimates that the right to use the vehicle has been transferred.

Further, when the in-vehicle unit includes the car navigation system for providing route guidance, the control unit may estimate whether the right to use the vehicle has been transferred by the following three procedures.

(Procedure 4) The control unit periodically acquires information on the storage location of the vehicle (home location of the user, parking lot location, or the like) registered in the car navigation system.

(Procedure 5) The control unit determines whether the information on the acquired storage location indicates a location different from the previously acquired storage location.

(Procedure 6) When the control unit determines that the information on the acquired storage location indicates a location different from the previously acquired storage location, the control unit estimates that the right to use the vehicle has been transferred.

Note that, the present disclosure can also be regarded as an information processing method in which a computer executes each of the above-mentioned processes, or an information processing program for causing the computer to execute each of the above-mentioned processes. The computer in that case corresponds to the above-mentioned information processing device. Such a computer is, for example, a server device under the control of a provider of telematics services.

Further, the present disclosure can also be regarded as the in-vehicle unit mounted on the vehicle. In that case, the control unit of the in-vehicle unit may acquire the contract user information from the server device and present the acquired contract user information to the occupant of the vehicle at the predetermined timing. With this configuration, the same effect as described above can be obtained.

Embodiment

Hereinafter, an embodiment of the present disclosure will be described with reference to the drawings. The configuration described in the embodiment is illustrative, and the present disclosure is not limited to the configuration illustrated in the embodiment.

Summary of System

FIG. 1 is a diagram showing a schematic configuration of a telematics system to which the present disclosure is applied. The telematics system according to the present embodiment includes an in-vehicle unit 100 mounted on a vehicle 10 and a server device 200 installed outside the vehicle 10. The in-vehicle unit 100 and the server device 200 perform two-way communication via a network. Although only one vehicle 10 is shown in FIG. 1, a plurality of the vehicles 10 may be included in the telematics system.

The in-vehicle unit 100 receives an operation relating to the telematics service, and transmits a request corresponding to the received operation to the server device 200. Further, the in-vehicle unit 100 receives the information returned from the server device 200 in response to the above request, and presents the received information to an occupant of the vehicle 10. Here, for example, when the occupant of the vehicle 10 performs an operation to designate a destination, the in-vehicle unit 100 transmits, to the server device 200, a route search request including information on the current position of the vehicle 10 and the destination. When a route search result is returned from the server device 200 in response to the above, the in-vehicle unit 100 receives the above route search result and performs setting of the destination in the car navigation system, setting of the route from the current position to the destination based on the received route search result, and the like. At that time, when the data for updating map information is included in a signal returned from the server device 200 to the in-vehicle unit 100, the in-vehicle unit 100 also updates the map information registered in the car navigation system. Note that, the operation relating to the telematics service is not limited to the above example, and may include an operation for requesting information search for weather, stores, tourist spots, etc., an operation for requesting a voice call with an operator, an operation for connecting to the Internet or the like. However, the in-vehicle unit 100 is associated with a user (contract user) who has a contract for the telematics service, and accepts only operations relating to the telematics service contracted by the contract user. Further, the in-vehicle unit 100 according to the present embodiment also has a function of presenting the information on the contract user to the occupant of the vehicle 10 in accordance with a command from the server device 200.

The server device 200 is managed by a telematics service provider (TSP). The server device 200 has a function of receiving various requests relating to the telematics service as described above from the in-vehicle unit 100 and providing information corresponding to the received requests to the in-vehicle unit 100. Further, the server device 200 according to the present embodiment has a function of acquiring the information (contract user information) on the contract user associated with the in-vehicle unit 100. The "contract user information" is information with which whether the user who has the right to use the vehicle 10 match the contract user can be identified, and information that a third party cannot identify the individual of the contract user. As such contract user information, for example, a part of the e-mail address of the contract user, a part of the telephone number of the contract user, the nickname of the contract user, or the like can be used. The server device 200 may acquire the contract user information at a predetermined cycle (for example, every few days, every few weeks, or every few months), or the server device 200 may acquire the contract user information, as triggered by the start-up of the vehicle 10 and the like. Further, the server device 200 has a function of generating a command (hereinafter may be referred to as a "presentation command") for the in-vehicle unit 100 to present the acquired contract user information to the occupant of the vehicle 10 at the predetermined timing and transmitting the generated presentation command to the in-vehicle unit 100. The "predetermined timing" is, for example, a timing at which an operation relating to the use of the telematics service is performed on the in-vehicle unit 100, or a timing at which the vehicle 10 is started. The term "starting the vehicle 10" as used herein means that the accessory power supply is switched from off to on, or that the ignition switch (or power switch or the like) is switched from off to on.

System Hardware Configuration

Figure 2:
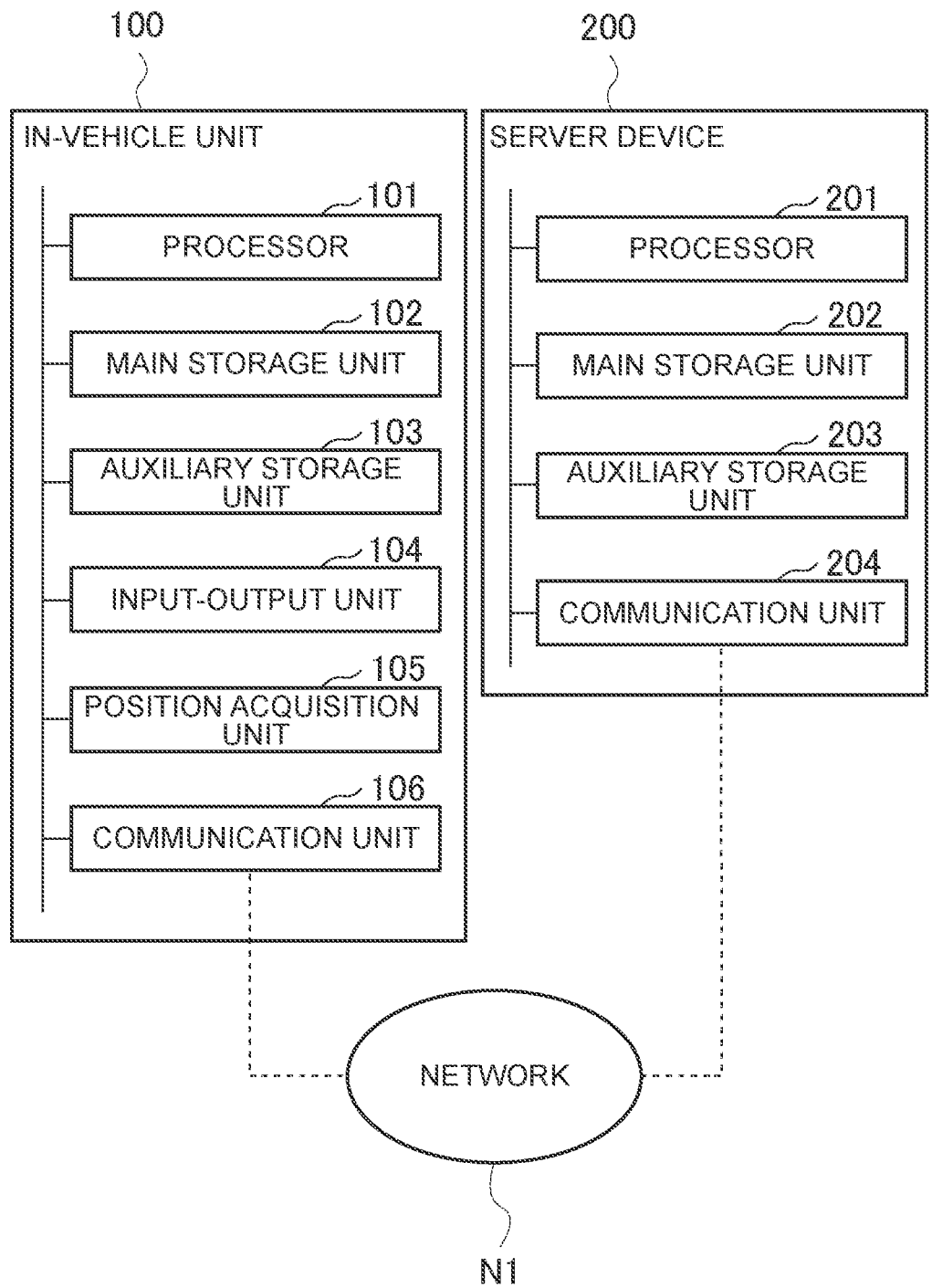
FIG. 2 is a diagram showing an example of the hardware configuration of an in-vehicle unit and a server device included in the telematics system.

FIG. 2 is a diagram showing an example of the hardware configuration of the in-vehicle unit 100 and the server device 200 included in the telematics system.

In-Vehicle Unit

The in-vehicle unit 100 is a small computer mounted on the vehicle 10. As shown in FIG. 2, the in-vehicle unit 100 includes a processor 101, a main storage unit 102, an auxiliary storage unit 103, an input-output unit 104, a position acquisition unit 105, and a communication unit 106. These units are connected to each other by a bus. The main storage unit 102 and the auxiliary storage unit 103 are computer-readable recording media. The hardware configuration of the in-vehicle unit 100 is not limited to the example shown in FIG. 2. Any components may be omitted, replaced, or added, as appropriate.

The in-vehicle unit 100 realizes a function that meets a predetermined purpose by executing a program stored in the auxiliary storage unit 103 by the processor 101. Note that some or all of the functions of the in-vehicle unit 100 may be realized by a hardware circuit such as an application specific integrated circuit (ASIC) or field programmable gate array (FPGA).

The processor 101 is, for example, a central processing unit (CPU) or a digital signal processor (DSP). The processor 101 controls the in-vehicle unit 100 by performing various information processing calculations.

The main storage unit 102 includes, for example, a random access memory (RAM), a read-only memory (ROM), and the like. The auxiliary storage unit 103 includes, for example, an erasable programmable ROM (EPROM), a hard disk drive (HDD), and the like.

The auxiliary storage unit 103 may also include a removable medium, that is, a portable storage medium. The removable medium is, for example, a universal serial bus (USB) memory, a compact disc (CD), or a digital versatile disc (DVD). The auxiliary storage unit 103 stores various programs, various kinds of data, and various tables in a recording medium so as to be readable and writable. The program stored in the auxiliary storage unit 103 includes a program relating to the telematics service in addition to an operating system (OS). The program relating to the telematics service includes, for example, a program for realizing the function of the car navigation system in the in-vehicle unit 100, a program for browsing the Internet, and the like. In this example, as the program relating to the telematics service, a program for realizing the function of presenting the contract user information to the occupant of the vehicle 10 in accordance with the presentation command from the server device 200 is also stored in the auxiliary storage unit 103. A part of the information or the entire information stored in the auxiliary storage unit 103 may be stored in the main storage unit 102.

The input-output unit 104 receives the input operation performed by the user and presents information to the user. The input-output unit 104 is configured by, for example, a touch panel and its control circuit, a liquid crystal display and its control circuit, a microphone and its control circuit, a speaker and its control circuit, and the like. The touch panel and the liquid crystal display may be configured by one touch panel display. In this example, the input-output unit 104 outputs the contract user information from the touch panel display at a predetermined timing based on the presentation command from the server device 200.

The position acquisition unit 105 is a device that acquires the current position of the in-vehicle unit 100 (current position of the vehicle 10). For example, the position acquisition unit 105 may include a global positioning system (GPS) receiver.

The communication unit 106 is a wireless communication interface for connecting the in-vehicle unit 100 to a network N1. The communication unit 106 connects to the network N1 using, for example, a mobile communication service such as fifth generation (5G) or long term evolution (LTE), or a wireless communication network such as Wi-Fi (registered trademark), and communicates with the server device 200 through the network N1.

The network N1 according to the embodiment is a wide area network (WAN) that is a global public communication network such as the Internet, or any other communication networks. The network N1 may include a telephone communication network such as a mobile phone network and a wireless communication network such as Wi-Fi (registered trademark) network.

Server Device

The server device 200 is a computer installed outside the vehicle 10. In the present example, the server device 200 is installed at a TSP office or the like. As shown in FIG. 2, the server device 200 includes a processor 201, a main storage unit 202, an auxiliary storage unit 203, and a communication unit 204. These units are connected to each other by a bus. The hardware configuration of the server device 200 is not limited to the example shown in FIG. 2. Any components may be omitted, replaced, or added, as appropriate.

The processor 201, the main storage unit 202, and the auxiliary storage unit 203 of the server device 200 are the same as the processor 101, the main storage unit 102, and the auxiliary storage unit 103 of the in-vehicle unit 100, respectively. However, the program stored in the auxiliary storage unit 203 includes a program for realizing a function for causing the in-vehicle unit 100 to present the contract user information to the occupant of the vehicle 10 at a predetermined timing.

The communication unit 204 is a communication interface for connecting the server device 200 to the network N1. The communication unit 204 is, for example, a local area network (LAN) interface board or a wireless communication circuit for wireless communication. The communication unit 204 connects to the network N1 through the LAN or the wireless communication network, and communicates with the in-vehicle unit 100 through the network N1.

Functional Configuration of Server Device

Figure 3:
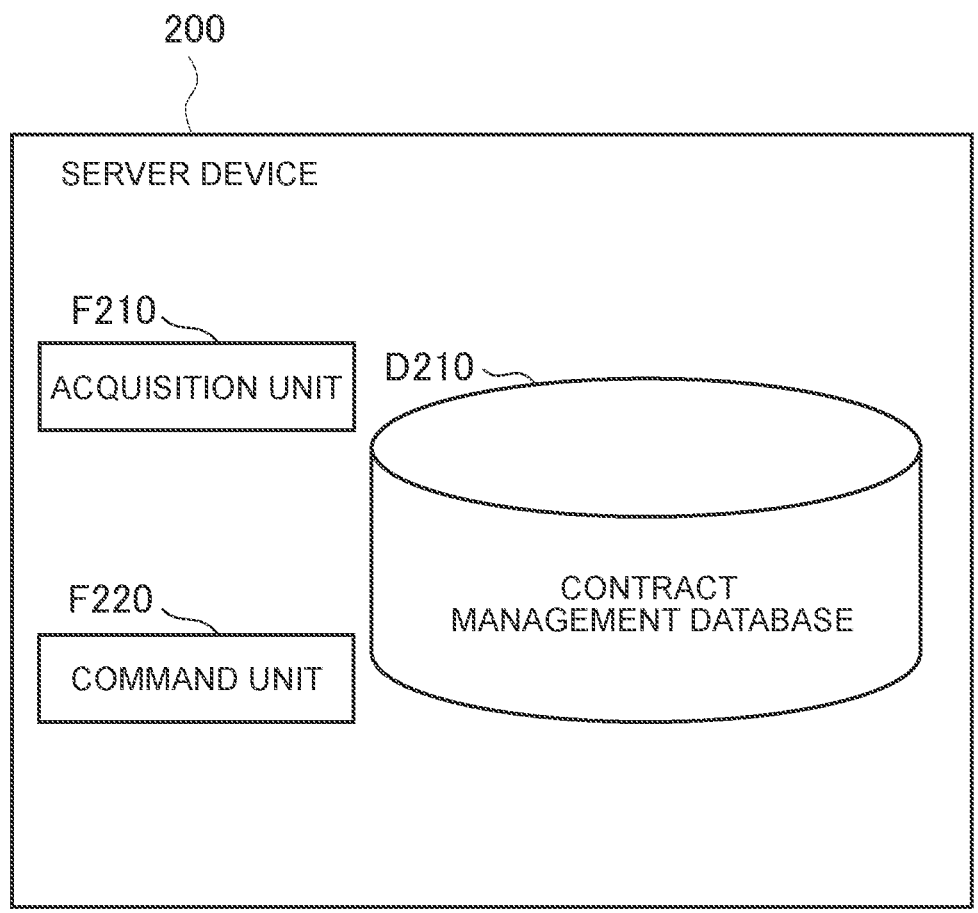
FIG. 3 is a block diagram showing an example of a functional configuration of the server device according to an embodiment.

Next, the functional configuration of the server device 200 will be described with reference to FIG. 3. As shown in FIG. 3, the server device 200 according to the present embodiment includes an acquisition unit F210, a command unit F220, and a contract management database D210 as its functional components. The acquisition unit F210 and the command unit F220 are realized by the processor 201 of the server device 200 as the processor 201 executes a program stored in the auxiliary storage unit 203. In addition, either one or a part of the acquisition unit F210 and the command unit F220 may be realized by the hardware circuit. The contract management database D210 is constructed in the auxiliary storage unit 203 when the processor 201 of the server device 200 executes a database management system (DBMS) program. The contract management database D210 is, for example, a relational database.

Note that any one of the functional components of the server device 200, or a part of its processing, may be executed by another computer connected to the network N1. For example, each process included in the acquisition unit F210 and each process included in the command unit F220 may be executed by separate computers.

The contract management database D210 stores information on the contract user, and the contract user and the in-vehicle unit 100 are associated with each other in the contract management database D210. An example of the configuration of information stored in the contract management database D210 will be described with reference to FIG. 4. FIG. 4 is a diagram showing a table structure of information stored in the contract management database D210. In the example shown in FIG. 4, a plurality of tables is stored in the contract management database D210. The tables are respectively set for the in-vehicle units. The configuration of the table (hereinafter may be referred to as "contract information table") stored in the contract management database D210 is not limited to the example shown in FIG. 4, and fields can be added, changed, or deleted as appropriate.

As shown in FIG. 4, each of the contract information tables stored in the contract management database D210 has fields for unit identification (ID) and contract user information. Information (unit ID) for identifying each in-vehicle unit 100 is registered in the unit ID field. In the contract user information field, the contract user information of the contract user associated with each in-vehicle unit 100 is registered. As described above, the contract user information is information with which whether the user who has the right to use the vehicle 10 matches the contract user can be identified, and information that a third party cannot identify the individual of the contract user. Such contract user information includes, for example, a part of the e-mail address of the contract user (a character string in which a part of the e-mail address is hidden), a part of the telephone number of the contract user (a character string in which a part of the telephone number is hidden), the nickname of the contract user, or the like. In the present example, a part of the e-mail address of the contract user is used as the contract user information. Note that, the contract user whose contract user information is registered in the contract user information field is not necessarily the same as the user who has the right to use the vehicle 10 on which the in-vehicle unit 100 associated with the contract user is mounted. For example, when the right to use the vehicle 10 is transferred from the contracted user to another user and the contracted user does not cancel the contract of the telematics service, the information of the user different from the user who has the right to use the vehicle 10 remains registered in the contract user information field.

The above-mentioned contract information table is registered in the contract management database D210 when the contract user signs a contract for using the telematics service with the TSP, and is deleted from the contract management database D210 when the contract user cancels the contract with the TSP.

Here, returning to FIG. 3, the acquisition unit F210 acquires the contract user information. Specifically, the acquisition unit F210 reads the contract user information stored in each contract information table for each unit ID by accessing the contract management database D210. Such processing is repeatedly executed in a predetermined cycle (for example, every few days, every few weeks, or every few months). Note that, when the telematics system is configured such that a predetermined signal (for example, information indicating that the vehicle 10 is started and a signal including the unit ID of the vehicle unit 100) is transmitted from the in-vehicle unit 100 to the server device 200, as triggered by the start-up of the vehicle 10, the acquisition unit F210 may acquire the contract user information of the contract user associated with the in-vehicle unit 100 when the server device 200 receives the predetermined signal. In that case, the acquisition unit F210 specifies the contract information table corresponding to the unit ID by accessing the contract management database D210 with the unit ID included in the predetermined signal as an argument. Next, the acquisition unit F210 may read the information registered in the contract user information field of the specified contract information table. The contract user information acquired by the above methods is passed from the acquisition unit F210 to the command unit F220, together with the unit ID.

The command unit F220 generates a presentation command using the acquisition unit F210 as triggered by acquisition of the contract user information. As described above, the presentation command is a command for displaying the contract user information on the in-vehicle unit 100 at a predetermined timing. The predetermined timing is the timing at which the operation relating to the use of the telematics service is performed on the in-vehicle unit 100. The operation relating to the use of the telematics service is, for example, an operation for displaying a menu screen relating to the telematics service in the in-vehicle unit 100, and is an operation performed by the occupant of the vehicle 10. The predetermined timing may be the timing at which the vehicle 10 on which the in-vehicle unit 100 is mounted is started. Further, the predetermined timing may be the timing at which the operation relating to the use of the telematics service is performed on the in-vehicle unit 100, or the timing at which the vehicle 10 on which the in-vehicle unit 100 is mounted is started. The presentation command generated by the command unit F220 is transmitted to the in-vehicle unit 100 corresponding to the unit ID through the communication unit 204.

Processing Flow

Figure 5:
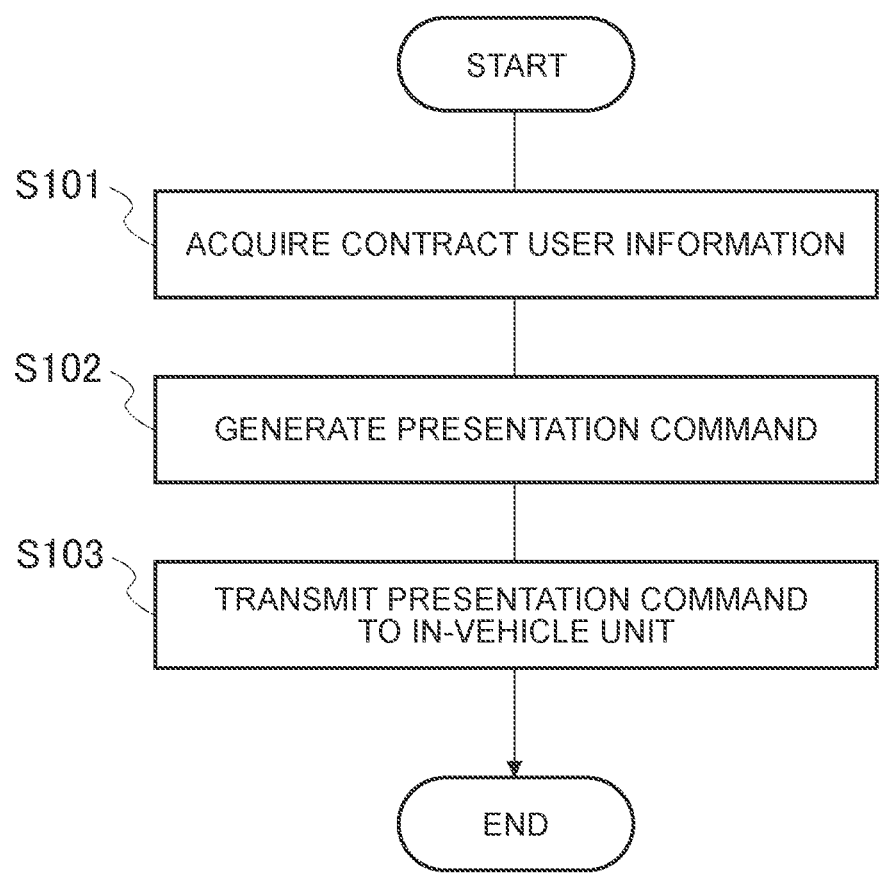
FIG. 5 is a flowchart showing a processing routine executed by the server device according to the embodiment.

The flow of processes executed by the server device 200 according to the present embodiment will be described with reference to FIG. 5. FIG. 5 is a flowchart showing a processing routine that is repeatedly executed in the server device 200 at a predetermined cycle (for example, every few days, every few weeks, or every few months).

In FIG. 5, the acquisition unit F210 of the server device 200 acquires the contract user information of the contract user associated with each in-vehicle unit 100 (step S101). That is, the acquisition unit F210 reads the contract user information associated with each in-vehicle unit 100 for each unit ID by accessing the contract management database D210. The contract user information for each unit ID acquired by the acquisition unit F210 is passed from the acquisition unit F210 to the command unit F220.

The command unit F220 generates a presentation command for each in-vehicle unit based on the information passed from the acquisition unit F210 (step S102). Specifically, the command unit F220 generates a command for displaying the contract user information at the predetermined timing for each in-vehicle unit.

The command unit F220 transmits the presentation command generated in step S102 to each in-vehicle unit 100 through the communication unit 204 (step S103).

Figure 6:
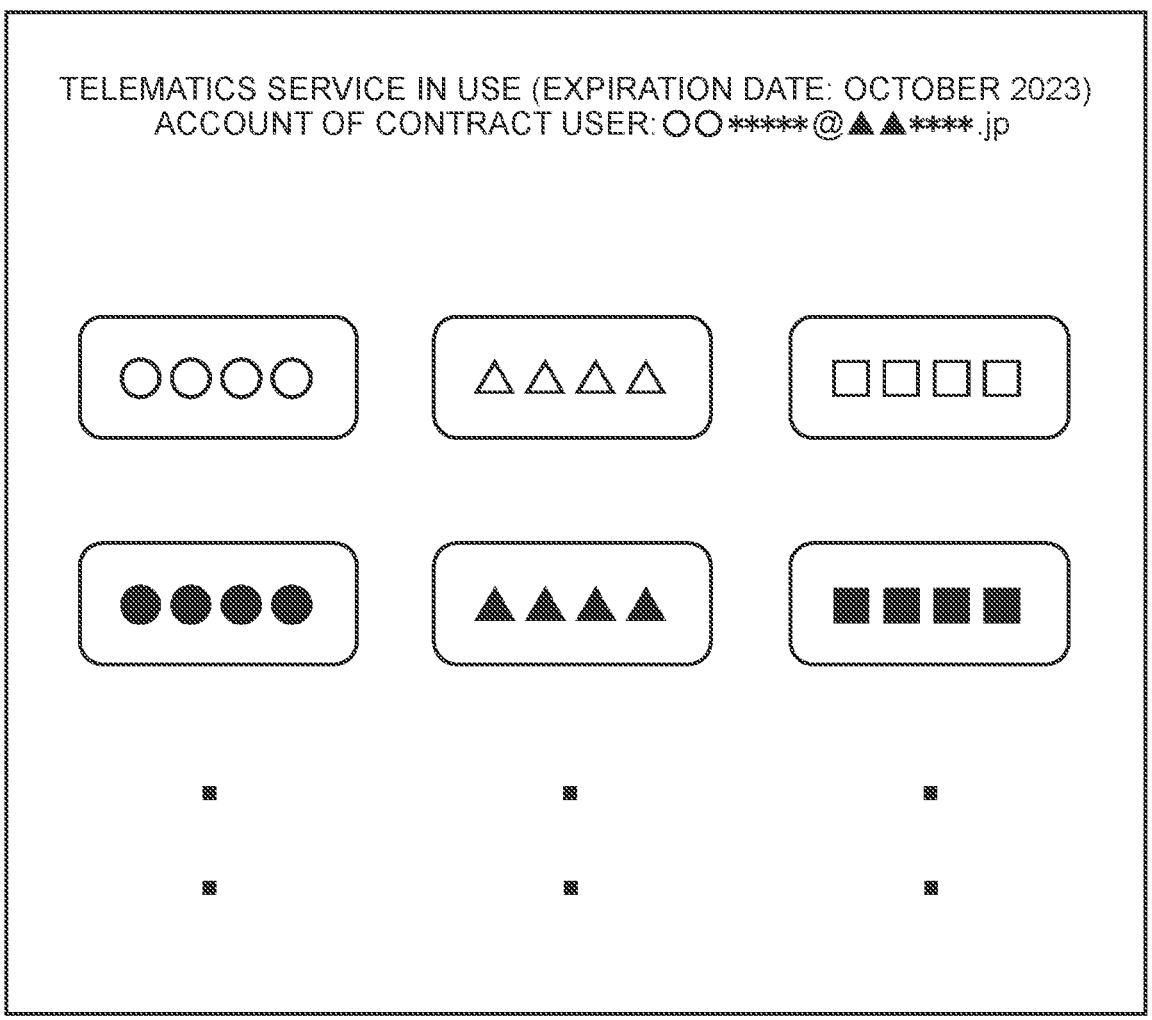
FIG. 6 is a diagram showing an example of a screen displayed by the in-vehicle unit at a predetermined timing.

In each in-vehicle unit 100 that has received the above-mentioned presentation command, the contract user information received from the server device 200 is displayed on the touch panel display of the input-output unit 104 at the predetermined timing. At that time, in the case where the predetermined timing is the timing at which the operation for displaying the menu screen relating to the telematics service is performed, the processor 101 of the in-vehicle unit 100 displays the screen as shown in FIG. 6 on the touch panel display of the input-output unit 104 when the operation to display the menu screen relating to the telematics service is performed. That is, the processor 101 of the in-vehicle unit 100 displays the menu screen including the display area of the contract user information on the touch panel display of the input-output unit 104. Note that, the menu screen relating to the telematics service may be the screen on which a button for selecting a type of telematics service that the occupant of the vehicle 10 desires to use (the Internet connection, voice call with the operator, information search, destination setting, etc.) is displayed, or may be the screen on which a button for selecting an item (change of user information, change of contract contents, etc.) for which the occupant of the vehicle 10 desires to change the setting is displayed. When the screen as shown in FIG. 6 is displayed on the touch panel display of the input-output unit 104 at the timing at which the operation for displaying the menu screen relating to the telematics service is performed, the occupant of the vehicle 10 can be made aware of the contract user information every time the operation relating to the use of the telematics service is performed. With this configuration, the occupant of the vehicle 10 can confirm whether the user who has the right to use the vehicle 10 matches the contract user each time the operation relating to the use of the telematics service is performed. Note that, in the case where the predetermined timing is the timing at which the vehicle 10 is started, the processor 101 of the in-vehicle unit 100 displays the screen including the display area of the contract user information on the touch panel display of the input-output unit 104 when the vehicle 10 is started. With this configuration, the occupant of the vehicle 10 can confirm whether the user who has the right to use the vehicle 10 matches the contract user each time the vehicle 10 is started.

Therefore, according to the present embodiment, for example, when the right to use the vehicle 10 is transferred from the first user to the second user and the first user forgets to cancel the contract of the telematics service, the second user can be made aware that the first user forgets cancellation. With this configuration, the second user can take measures to cancel the contract of the telematics service by the first user. Further, the contract user information according to the present embodiment is a part of the e-mail address, a part of the telephone number, a nickname, or the like. Therefore, identification of the individual of the first user by the second user to which the contract user information is presented can be suppressed. As a result, it is possible to suppress the convenience of the user who uses the telematics service from being impaired.

First Modification

In the embodiment described above, the example in which the timing at which the operation relating to the use of the telematics service is performed on the in-vehicle unit 100, or the timing at which the vehicle 10 is started is set to the predetermined timing has been described. On the other hand, in the present modification, an example in which, after the right to use the vehicle 10 is estimated to have been transferred, the timing at which the operation relating to the use of the telematics service is first performed on the in-vehicle unit 100, or the timing at which the vehicle 10 is first started is set to the predetermined timing will be described.

Functional Configuration of Server Device

Figure 7:
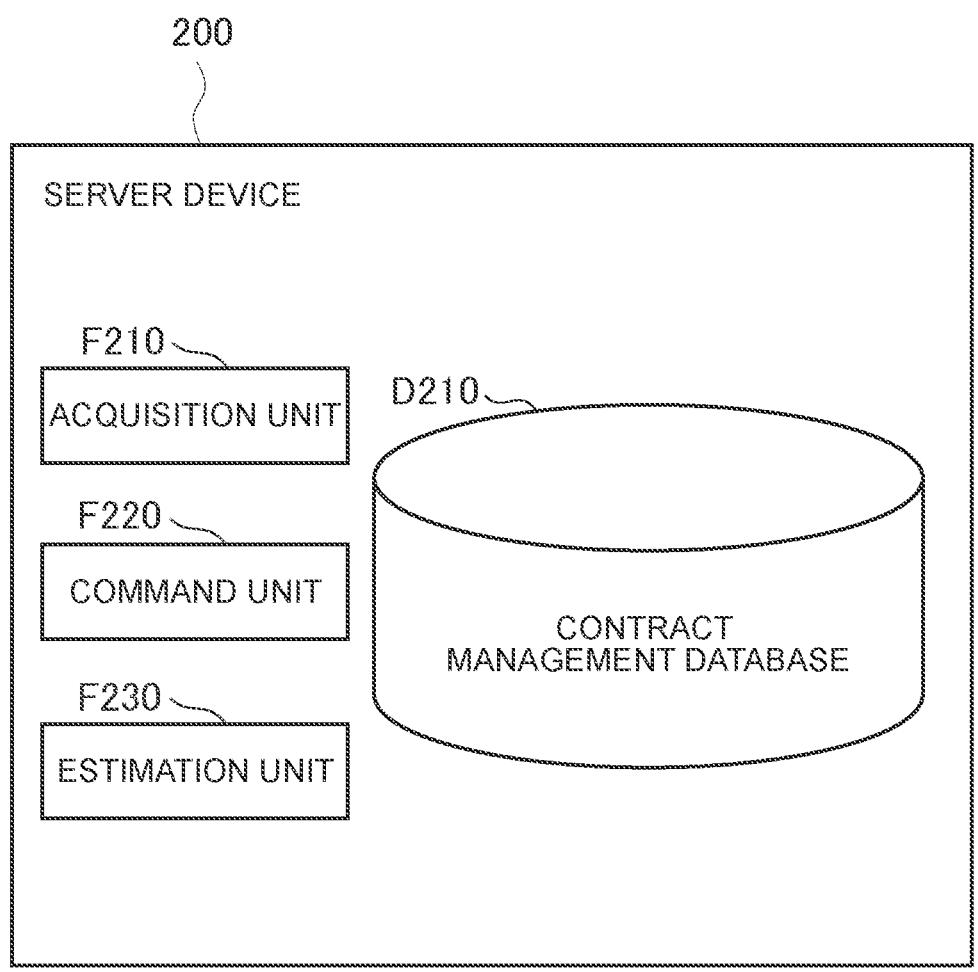
FIG. 7 is a block diagram showing an example of a functional configuration of a server device according to a modification.

FIG. 7 is a block diagram showing an example of a functional configuration of the server device 200 according to the present modification. The server device 200 according to the present modification has an estimation unit F230 in addition to the acquisition unit F210, the command unit F220, and the contract management database D210 as its functional component. The functional components are realized by the processor 201 of the server device 200 as the processor 201 executes a program stored in the auxiliary storage unit 203.

The estimation unit F230 estimates whether the right to use the vehicle 10 has been transferred. For making such an estimation, the estimation unit F230 acquires information on the storage location of the vehicle 10 on a regular basis (for example, every few weeks or every few months). The information on the storage location of the vehicle 10 may be acquired by causing the in-vehicle unit 100 to periodically transmit, to the server device 200, information on the storage location (home location, parking lot location, or the like) registered in the car navigation system of the in-vehicle unit 100. Alternatively, the in-vehicle unit 100 may be caused to periodically (for example, every few minutes or every few hours) transmit the current position information acquired by the position acquisition unit 105 of the in-vehicle unit 100 to the server device 200, and the estimation unit F230 may estimate the storage location based on the history of the current position information received by the server device 200. For example, the estimation unit F230 may estimate the location where the parking time of the vehicle 10 (the time during which the current position of the vehicle 10 remains in the same place) is the longest in a certain period (for example, one week or one month) as the storage location of the vehicle 10.

When the information on the storage location of the vehicle 10 is acquired using the above method, the estimation unit F230 determines whether the information on the currently acquired storage location indicates the same location as the previously acquired storage location. Note that, in the present modification, the information on the storage location previously acquired by the estimation unit F230 is registered in the contract information table of the contract management database D210. That is, as shown in FIG. 8, the contract information table according to the present modification is configured to include a storage location field in addition to the unit ID field and the contract user information field. The storage location field is a field for registering the information on the storage location of the vehicle 10 on which each in-vehicle unit 100 is mounted, and is updated every time the storage location is acquired by the estimation unit F230.

Here, when the information on the currently acquired storage location indicates the same location as the previously acquired storage location, the estimation unit F230 estimates that the right to use the vehicle 10 has not been transferred. On the other hand, when the information on the currently acquired storage location indicates a different location from the previously acquired storage location, the estimation unit F230 estimates that the right to use the vehicle 10 has been transferred. The estimation result by the estimation unit F230 is passed from the estimation unit F230 to the acquisition unit F210 together with the unit ID of the in-vehicle unit 100 mounted on the vehicle 10 that is an estimation target.

The acquisition unit F210 in the present modification acquires the contract user information only for the in-vehicle unit 100 mounted on the vehicle 10 of which right to use the vehicle 10 is estimated to have been transferred. In other words, the contract user information is not acquired for the in-vehicle unit 100 mounted on the vehicle 10 of which right to use the vehicle 10 is estimated to have not been transferred. With this configuration, the contract user information is delivered from the acquisition unit F210 to the command unit F220 only for the in-vehicle unit 100 mounted on the vehicle 10 of which right to use the vehicle 10 is estimated to have been transferred.

The command unit F220 according to the present modification generates the presentation command only for the contract user information received from the acquisition unit F210. That is, the command unit F220 generates the presentation command only for the in-vehicle unit 100 mounted on the vehicle 10 of which right to use the vehicle 10 is estimated to have been transferred. The presentation command according to the present modification is a command for causing the in-vehicle unit 100 to display the contract user information only at the first predetermined timing after the right to use the vehicle 10 is estimated to have been transferred. For example, the presentation command is a command for causing the in-vehicle unit 100 to display the contract user information only at the timing at which the operation relating to the use of the telematics service is first performed on the in-vehicle unit 100, or at the timing when the vehicle 10 is first started after the right to use the vehicle 10 is estimated to have been transferred.

Process Flow

Figure 9:
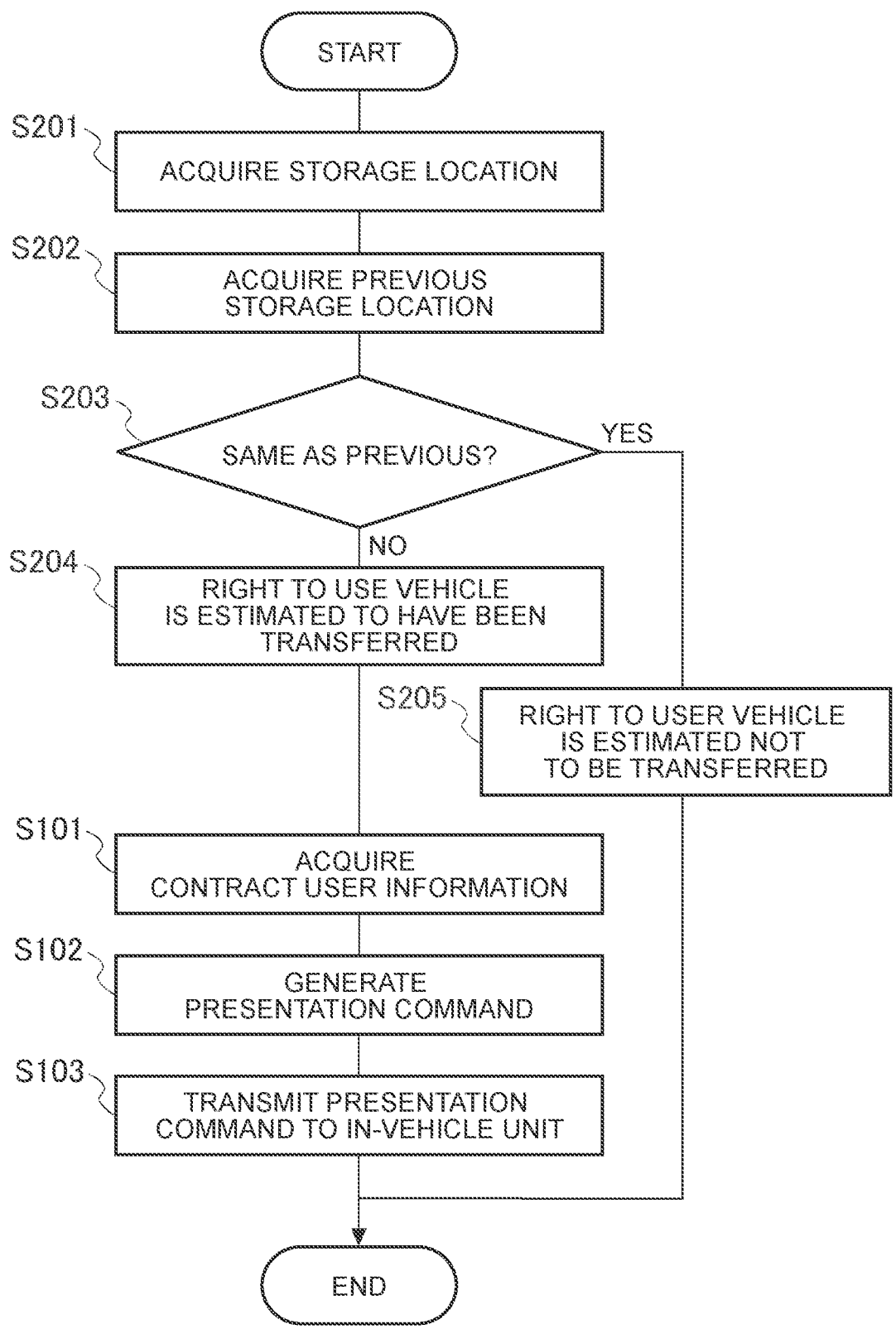
FIG. 9 is a flowchart showing a processing routine executed by the server device according to the modification.

Here, the flow of processes executed in the server device 200 according to the present modification will be described with reference to FIG. 9. FIG. 9 is a flowchart showing a processing routine executed periodically (for example, every few weeks or every few months) in the server device 200. In FIG. 9, the same reference numerals are assigned to the same processes as those in FIG. 6 described above.

In FIG. 9, the estimation unit F230 of the server device 200 acquires the information on the storage location of the vehicle 10 on which each in-vehicle unit 100 is mounted (step S201). Specifically, the estimation unit F230 acquires the information on the storage location registered in the car navigation system of each in-vehicle unit 100 by communicating with each in-vehicle unit 100. Alternatively, the estimation unit F230 estimates the storage location of the vehicle 10 on which each in-vehicle unit 100 is mounted, based on the history of the current position information periodically acquired from each in-vehicle unit 100.

The estimation unit F230 acquires the previously acquired storage location of each vehicle 10 (step S202). Specifically, the estimation unit F230 reads out the information registered in the storage location field in each contract information table of the contract management database D210.

The estimation unit F230 compares the storage location acquired in step S101 with the storage location acquired in step S202 for each in-vehicle unit so as to determine whether the storage location of the vehicle 10 on which each in-vehicle unit 100 is mounted is the same as the previous storage location (step S203). Here, when the vehicle 10 of which storage location acquired in step S101 is different from the previously acquired storage location is present (negative determination in step S203), the estimation unit F230 estimates that the right to use the vehicle 10 has been transferred (step S204). In that case, the processes in steps S101 to S103 are executed. In steps S101 to S103, the contract user information is acquired, the presentation command is generated, and the presentation command is transmitted only for the in-vehicle unit 100 mounted on the vehicle 10 of which right to use the vehicle 10 is estimated to have been transferred. Further, for generation of the presentation command, the command for causing the in-vehicle unit 100 to display the contract user information is generated only at the first predetermined timing after the right to user the vehicle 10 is estimated to have been transferred. On the other hand, when the vehicle 10 of which storage location acquired in step S101 is different from the previously acquired storage location is not present (affirmative determination in step S203), the estimation unit F230 estimates that the right to use any of the vehicles 10 under the control of the server device 200 is not transferred (step S205). In that case, execution of the processing routine is completed without executing the processes in steps S101 to S103.

According to the present modification, the information on the contract user is presented to the occupant at the first predetermined timing only when the right to use the vehicle 10 is estimated to have been transferred. With this configuration, the occupant of the vehicle 10 can be made aware of the contract user information while the occupant is suppressed from being annoyed.

Others

The above-described embodiment and modifications are merely examples, and the present disclosure may be appropriately modified to be implemented without departing from the scope thereof. Also, the processes and the configurations described in the present disclosure can be appropriately combined to be implemented as long as no technical contradiction occurs. Moreover, the processes described as being executed by one device may be shared and executed by a plurality of devices. For example, a part of the processes executed by the server device 200 may be executed by the in-vehicle unit 100. That is, the processor 101 (control unit) of the in-vehicle unit 100 may acquire the contract user information from the server device 200 and cause the input-output unit 104 to display the acquired contract user information at the predetermined timing. At that time, the contract user information may be acquired as triggered by the start-up of the vehicle 10, or may be acquired when the vehicle 10 is not started (when the ignition or the power switch is off). Alternatively, the processes described as being executed by different devices may be executed by one device. In the computer system, it is possible to flexibly change the hardware configuration for implementing each function.

The present disclosure can also be implemented by supplying a computer with a computer program that implements the functions described in the above embodiment and modifications and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is a recording medium that can store information such as data and programs by electrical, magnetic, optical, mechanical, or chemical action and can be read from a computer or the like. Such a non-transitory computer-readable storage medium is, for example, a disc of any type such as a magnetic disc (floppy (registered trademark) disc, hard disk drive (HDD), and the like) and an optical disc (compact disc read-only memory (CD-ROM), digital versatile disc (DVD), Blu-ray disc, and the like). Further, the non-transitory computer-readable storage medium may be a medium such as a read-only memory (ROM), a random access memory (RAM), an erasable programmable read-only memory (EPROM), an electrically erasable programmable read-only memory (EEPROM), a magnetic card, a flash memory, an optical card, or a solid state drive (SSD).

What is claimed is:

1. An information processing device comprising a control unit that executes:
   acquisition of information on a contract user who has a contract for a telematics service usable through an in-vehicle unit mounted on a vehicle;
   periodic estimation of a storage location of the vehicle based on position information of the vehicle acquired through the in-vehicle unit;
   determination as to whether the estimated storage location of the vehicle is changed from a previously estimated storage location;
   estimation that a right to use the vehicle has been transferred when the estimated storage location of the vehicle is determined to be changed from the previously estimated storage location; and
   transmission of a command to the in-vehicle unit, the command being for presenting the information on the contract user to an occupant of the vehicle, when an operation relating to use of the telematics service is first performed on the in-vehicle unit after the right to use the vehicle is estimated to have been transferred.

2. An information processing device comprising a control unit that executes:
   acquisition of information on a contract user who has a contract for a telematics service usable through an in-vehicle unit which is mounted on a vehicle and which includes a car navigation system that provides route guidance;
   periodic acquisition of information on a storage location of the vehicle that is registered in the car navigation system;
   determination as to whether the acquired information on the storage location indicates a location different from a previously acquired storage location;
   estimation that a right to use the vehicle has been transferred when the acquired information on the storage location is determined to indicate the location different from the previously acquired storage location; and
   transmission of a command to the in-vehicle unit, the command being for presenting the information on the contract user to an occupant of the vehicle, when an operation relating to use of the telematics service is first performed on the in-vehicle unit after the right to use the vehicle is estimated to have been transferred.

3. The information processing device according to claim 1, wherein the information on the contract user is a part of an e-mail address of the contract user.

4. An information processing method executed by a computer, the information processing method comprising:
   a step of acquiring information on a contract user who has a contract for a telematics service usable through an in-vehicle unit mounted on a vehicle;
   a step of periodically estimating a storage location of the vehicle based on position information of the vehicle acquired through the in-vehicle unit;
   a step of determining whether the estimated storage location of the vehicle is changed from a previously estimated storage location;
   a step of estimating that a right to use the vehicle has been transferred when the estimated storage location of the vehicle is determined to be changed from the previously estimated storage location; and
   a step of transmitting a command to the in-vehicle unit, the command being for presenting the information on the contract user to an occupant of the vehicle, when an operation relating to use of the telematics service is first performed on the in-vehicle unit after the right to use the vehicle is estimated to have been transferred.

5. The information processing method according to claim 4, wherein the information on the contract user is a part of an e-mail address of the contract user.

\* \* \* \* \*